Sept. 8, 1931. H. O. EIANE 1,822,694

RADIAL CONNECTING ROD

Filed Dec. 31, 1928

Inventor

Halvor Olsen Eiane

Patented Sept. 8, 1931

1,822,694

UNITED STATES PATENT OFFICE

HALVOR OLSEN EIANE, OF WASHINGTON ISLAND, WISCONSIN

RADIAL CONNECTING ROD

Application filed December 31, 1928. Serial No. 329,395.

My invention relates to improvements in radial connecting rods for use in engines with radially disposed cylinders in which the master connecting rod is provided with a split crank-pin bearing. The objects of my improvements are to provide a radial connecting rod assembly which is comparatively light and strong, and which can easily and quickly be connected to a one-piece crank-shaft of a radial engine, and in which the bolts for connecting the articulating rods to the crank-pin bearing end of the master connecting rod, also serve the purpose of holding the two halves of the split crank-pin bearing together, through special joining plates which overlap said split.

Figure 2:
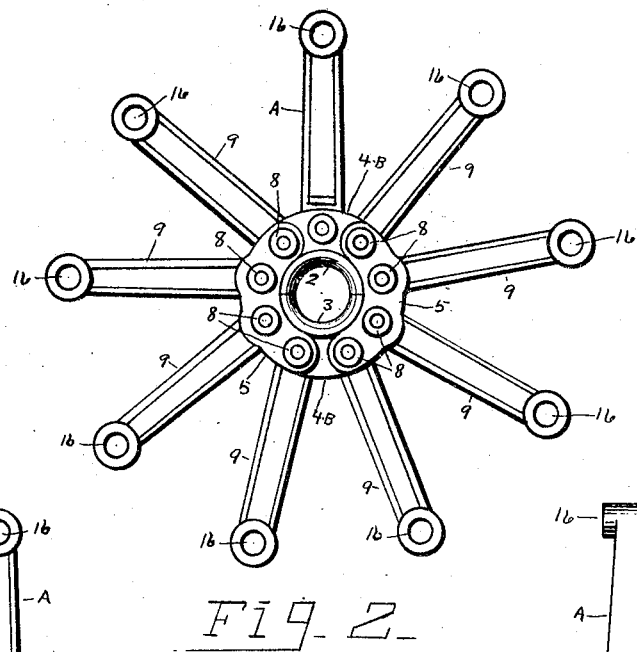
Figure 1:
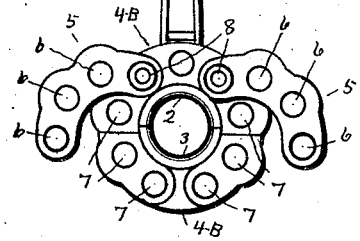

I attain these objects by the use of a radial connecting rod assembly hereinafter more fully described and claimed having reference to the accompanying drawings in which Figure 1 represents a front view of the master connecting rod with joining plates spread out, and the lower half of the crank-pin bearing in its place. Figure 2 represents a front view of the complete radial connecting rod assembly, with crank-pin bearing joining plates bolted in their correct position.

Figure 3:
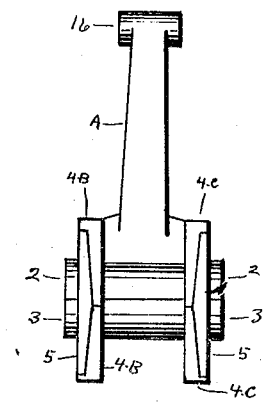
Figure 4:
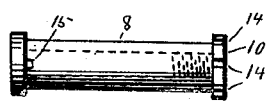
Figure 5:
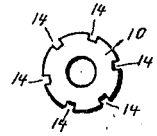
Figure 6:
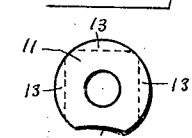

Figure 3 is a side view of the master connecting rod, showing the joining plates edgewise as forming parts of the two circumferential ridges which support the articulating rods. Figure 4 is a side view of one of the connecting bolts, having a solid head in one end and a cap-screw in the opposite end. Figure 5 represents an end view of the cap-screw and Figure 6 is a flat side view of a lock washer.

A, in Figures 1, 2 and 3, is the master connecting rod; 2 is the upper half of the crank-pin bearing, and 3 is the lower of that bearing. 4B and 4C are the two circumferential ridges, and 5, 5, are the crank-pin bearing joining plates, of which there are four in number, and which are fitted into recesses milled out in the circumferential ridges 4B and 4C, in such position as to overlap the split between the upper and lower halves of the crank-pin bearing. The holes 6, 6 in the joining plates 5, 5, (shown in Figure 1,) correspond exactly with the holes 7, 7, in the circumferential ridge 4B, so that the connecting bolts 8, 8, will pass through from ridge to ridge.

In the act of connecting up the master connecting rod to a crank-shaft, the following operations take place: First the lower half 3, of the crank-pin bearing is removed and a couple connecting bolts 8, 8, are temporarily put into place to hold the joining plates 5, 5, in a spread out position, as shown in Figure 1, and the upper half of the crank-pin bearing indicated by the numeral 2, put in position on a crank-pin of a crank-shaft, while the lower half of the crank-pin bearing indicated by the numeral 3, is put in position from the opposite side and the joining plates 5, 5, pressed together until the holes 6, 6, and 7, 7, are in line. Now the articulating rods 9, 9, which are alike in both ends, can be put in between the two circumferential ridges 4B, and 4C, and the connecting bolts 8, 8, put through the holes 6, 6, and 7, 7, in the circumferential ridge 4B, and through bearing holes in the inner ends of the articulating rods 9, 9, (not shown) and finally through holes in the circumferential ridge 4C, (not shown) but corresponding to holes 7, 7, in the ridge 4B.

The connecting bolts 8, 8, which are hollow through their centers, are threaded in the opposite ends from their heads, for reception of cap-screws 10. Lock washers 11, provided with a segmental notch 12, which correspond to the outer circular surface of the two halves of the crank-pin bearing 2, and 3, are placed under the heads of the cap-screws 10, and seated against the flat side of the circumferential ridge 4C. After the cap-screws 10, are screwed tight, the lock washers 11, are bent at right angles along dotted lines 13, 13, (shown in Figure 6,) and with a special tool pressed into the spanner notches 14, 14, in the heads of the cap-screws 10, and thus produce effective locking. The connecting bolts 8, 8, are kept from turning by the dowel pins 15, (shown in Figure 4,) which fit into respective notches in the holes 6, 6, (not shown).

The master connecting rod A, including the upper half crank-pin bearing 2, and the upper half of the circumferential ridges 4B, and 4C, will preferably be made integral, and provided with babbitt lining in the bearing; and the lower half likewise constructed.

The outer bearing holes 16, 16, in the master connecting rod A, and the articulating rods 9, 9, are for connections to pistons and will be lined with bronze bushings, as well as the inner bearing holes in the articulating rods 9, 9, (not shown).

I do not intend to limit my invention to the exact description and drawings as herein given, as many changes can be made without departing from the principles involved.

Having thus described my invention, what I claim as new and desire to secure by Letters Patent is:

1. In a radial connecting rod assembly, a master connecting rod having split crank-pin bearing provided with a pair of circumferential ridges and said ridges provided with joining plates overlapping said split, said joining plates and ridges having holes therethrough adapted for reception of bolts serving the dual purpose of holding said split crank-pin bearing together and providing pivotal connections for a plurality of articulating rods to said master connecting rod.

2. In a radial connecting rod assembly for radial engines, a master connecting rod having split crank-pin bearing and a pair of circumferential ridges likewise split, forming upper and lower halves of said crank-pin bearing, recesses in said circumferential ridges for reception of joining plates overlapping said split, said joining plates and circumferential ridges having holes therethrough parallel to the line of axis in said crank-pin bearing for reception of bolts serving the dual purpose of binding said upper and lower halves of said crank-pin bearing together and providing pivotal connections for a plurality of articulating rods to said master connecting rod, and means for locking said bolts in position.

3. A radial connecting rod assembly, comprising a master connecting rod with split crank-pin bearing and circumferential ridges, joining plates overlapping the split in said ridges, said joining plates and ridges having holes therethrough for reception of bolts binding the split in said bearing and affording pivotal connections to articulating rods, in combination with cap-screws adapted to screw into the ends of said bolts, and lock-washers adapted to bear against the rounded surface of said crank-pin bearing and with turned-up sides pressed into spanner notches in the heads of said cap-screws, to prevent turning of said screws, all substantially as described.

Signed at Washington Island, in the county of Door and State of Wisconsin, this twenty-fourth day of December, 1928.

HALVOR OLSEN EIANE.